United States Patent [19]

Kawai

[11] Patent Number: 4,724,716

[45] Date of Patent: Feb. 16, 1988

[54] JOINT MECHANISM

[75] Inventor: Takeshi Kawai, Kakogawa, Japan

[73] Assignee: Kabushiki Kaisha Kobe Seiko Sho, Kobe, Japan

[21] Appl. No.: 694,447

[22] PCT Filed: Apr. 26, 1984

[86] PCT No.: PCT/JP84/00217

§ 371 Date: Dec. 24, 1984

§ 102(e) Date: Dec. 24, 1984

[87] PCT Pub. No.: WO84/04270

PCT Pub. Date: Nov. 8, 1984

[30] Foreign Application Priority Data

Apr. 27, 1983 [JP] Japan ................... 58-75387

[51] Int. Cl.$^4$ ............................................. B25J 17/02
[52] U.S. Cl. ...................................... 74/479; 414/735; 464/117; 901/19; 901/29
[58] Field of Search ............... 901/19, 27, 28, 29; 414/735, 732; 74/469, 479; 464/113, 114, 117, 118, 179

[56] References Cited

U.S. PATENT DOCUMENTS 4,107,948 8/1978 Molavg ................. 901/27 X
4,300,362 11/1981 Lande et al. ............ 901/19 X
4,511,305 4/1985 Kawai ..................... 901/29 X

FOREIGN PATENT DOCUMENTS 1498033 9/1967 France .
57-66890 4/1982 Japan .
58-16998 4/1983 Japan .
58-71092 4/1983 Japan .
151574 3/1984 Norway .

Primary Examiner—Leslie J. Paperner
Assistant Examiner—Donald W. Underwood
Attorney, Agent, or Firm—Oblon, Fisher, Spivak, McClelland, & Maier

[57] ABSTRACT

A joint mechanism in which a plurality of joints are connected in series and each of the joints may be folded. A chain-like connection of intermediate links ($L_1$, ...) through universal joints ($U_1$, ...) enables the intermediate links ($L_1$, ...) to be folded in any direction, and an arrangement of ball joints ($B_1$, ...) and sliding joints ($S_1$, ...) at the connections of the intermediate links ($L_1$, ...) does not cause any twisting force to be applied to the intermediate links when folded. The joint mechanism shows a soft resiliency and performs an accurate positioning of the distal end of the joint.

22 Claims, 11 Drawing Figures

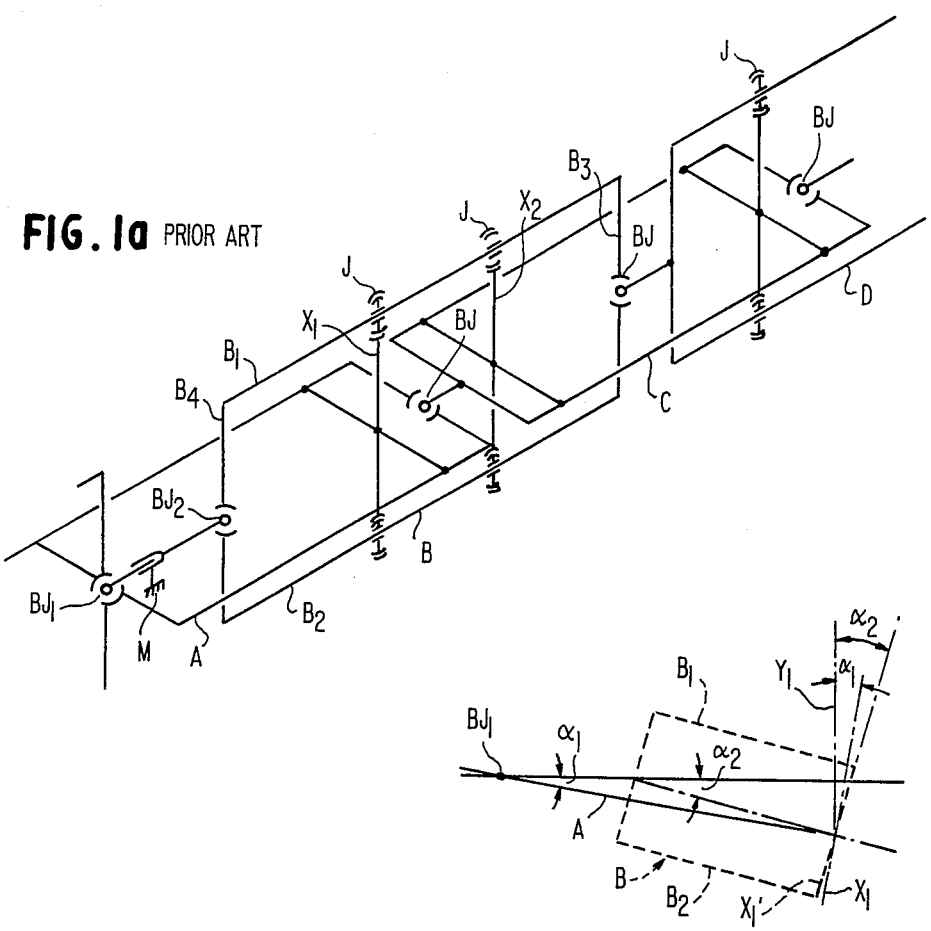
FIG. 1a PRIOR ART
FIG. 1b PRIOR ART
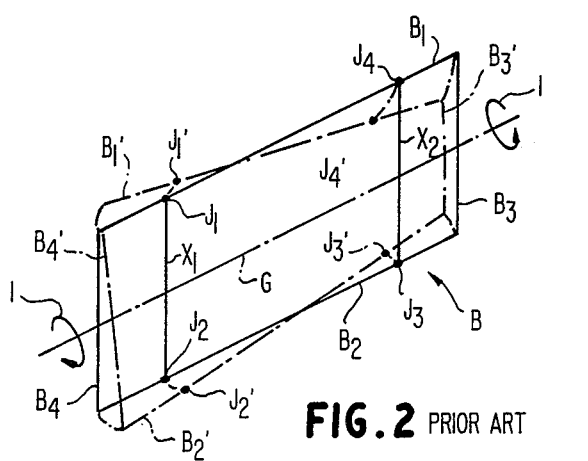
FIG. 2 PRIOR ART

JOINT MECHANISM

BACKGROUND OF THE INVENTION

1. Field of the Invention:

This invention relates to a joint mechanism in which several joints are connected in series so as to get a soft resiliency. More particularly, it relates to a joint mechanism which may be flexed in any direction and in which a highly precise positioning of the distal end of the joint mechanism may be obtained; high durability, softness and rigidity can be obtained; and which is preferable for arms or wrists of robots or manipulators, etc.

2. Description of the Prior Art:

As one example of a soft joint mechanism, a robot arm described in Japanese Laid-Open Patent Application No. 57-66890 is already known. This robot arm is made such that, as shown in FIG. 1(a), the closed ring-shaped links A, B, C . . . are linked like a chain. The adjoining links are connected by rotary sliding joints J in which an axial sliding and a swivelling can be performed simultaneously. Alternate links are swivellingly connected to each other by ball joints BJ arranged on a central axis of the joints. A fixed machine table M and the proximal link A are swivellingly connected by a ball joint $BJ_1$, and the second link B is also connected to the fixed machine table M with a ball joint $BJ_2$.

In the case of the above-described robot arm, the proximal link A is oscillated (by means not shown) in respect to the machine table M in a horizontal plane containing the link A around the ball joint $BJ_1$. This oscillation causes all the links to swivel in the swivelling direction. That is, each of the joints undergoes a swivelling movement, so that an entire smooth swivelling movement may be provided and a soft arm may also be attained.

However, in the case of the above-described robot arm, when the link A is swivelled in a vertical plane crossing at a right angle with a horizontal plane containing the above link A, for example, by an angle $\alpha_1$ around the ball joint $BJ_1$, as shown in FIG. 1(b), a member connecting the link A to the link B is fixed to the link A at a right angle thereto, so that, after the swivelling operation, the link B has an inclination angle of $\alpha_1$ in respect to a vertical plane $Y_1$.

In turn, in the case of the link B, the link B swivels only by an angle $\alpha_2$ due to a swivelling operation of the above link A around the ball joint $BJ_2$ (placed at the fixed position). It can easily be seen that $\alpha_1 \neq \alpha_2$, due to the different rotational centers of the links A, B. Along with this movement, the member $X_1$ is also inclined at an angle of $\alpha_2$ in respect to the vertical plane $Y_1$ (to $X_1'$).

In turn, the member $X_1$ is fixed at a right angle to the link A as described above, so that the member $X_1$ must be inclined by an angle of $\alpha_1$ in respect to the vertical plane $Y_1$ due to the swivelling operation of the link A. Accordingly, the angle $\alpha_2$ in respect to the vertical plane $Y_1$ can not be obtained. That is, the member $X_1$ can not maintain a right angle in respect to the upper and lower sides $B_1$ and $B_2$ of the link B. Accordingly, the member $X_1$ can be inclined only by an angle of $(\alpha_2 - \alpha_1)$ in respect to the sides $B_3$ and $B_4$, which are perpendicular to the sides $B_1$ and $B_2$.

However, since the link B is naturally composed of highly rigid material, the distance between the sides $B_1$ and $B_2$ forming the link B is kept constant, and the length of the member $X_1$ is also kept constant. Furthermore, the distance between the rotary sliding joints J, J at both ends of the member may not be varied, so the member $X_1$ is kept at a right angle in respect to the sides $B_1$ and $B_2$, and the member $X_1$ may not be inclined only by an angle of $(\alpha_2 - \alpha_1)$ in respect to the sides $B_3$ and $B_4$.

Therefore, in the case of the robot arm as described above, the folding direction is limited in a horizontal plane containing the link A shown in FIG. 1(a). That is, the arm may not be folded in a direction perpendicular to the former folding direction, and so this arm is not capable of being flexed in any direction.

This type of robot arm has the disadvantage that, if the arm is twisted by an application of external force, the swivelling function of the rotary sliding joint J is decreased, and a smooth swivelling movement may not be performed due to a so-called twisted condition.

That is, for example, assuming that the intermediate link B is taken out as shown in FIG. 2, if a twisting moment indicated by an arrow 1 is applied to the link B, the four sides $B_1$, $B_2$, $B_3$ and $B_4$ constituting the link B are displaced to $B_1'$, $B_2'$, $B_3'$ and $B_4'$ as viewed in the figure, the rotary sliding joints $J_1$, $J_4$ and $J_2$, $J_3$ fixed to the sides $B_1$ and $B_2$ are displaced to the positions $J_1'$, $J_4'$ and $J_2'$, $J_3'$, respectively, and the distances $J_1$, $J_2$ and $J_3$, $J_4$ between the upper and lower rotary sliding joints are displaced to $J_1'$, $J_2'$ and $J_3'$, $J_4'$.

In turn, this type of robot arm has the disadvantage that, since the upper and lower rotary sliding joints $J_1$ and $J_2$ are connected by the member $X_1$ and similarly the upper and lower sliding joints $J_3$ and $J_4$ are connected by the member $X_2$ such that their distances may not be varied as described above, an application of twisting moment to the link B as above may cause a force for prohibiting the sliding of each of the rotary sliding joints $J_1$ to $J_4$. At the same time, each of the rotary sliding joints $J_1$ to $J_4$ may be twisted in respect to each of the sides $B_1$ and $B_2$, resulting in the sliding function of each of the rotary sliding joints being diminished and the folding operation at each of the joints being made null.

Such disadvantages as above are based on the fact that this type of robot arm has the rotary sliding joint at a position displaced from the axis G of each of the links and has a connection between the upper and lower rotary sliding joints, for example, $J_1$ and $J_2$ with the member $X_1$ etc. in such a way that the distance between them may be kept constant.

The robot arm described above has further disadvantages in that the above rotary sliding joint J is required in order to cause the fixing positions of the members $X_1$ and $X_2$ in respect to the sides $B_1$ or $B_2$ to be variable The rotary sliding joint J has in general a ball bearing therein, and an increased loading capacity of the ball bearing may require an application of a large-sized ball bearing. The rotary sliding joint J is, as shown in FIG. 1(a), placed at the outermost part of the joint mechanism, so that the application of a large-sized ball bearing causes the entire joint mechanism to be of a large size. Furthermore, the sides $B_1$ and $B_2$ pass through the ball bearing, so that the member $X_1$ exhibits a narrow swivelling range in respect to the side $B_1$ etc., and a large folding angle may not be obtained.

As described above, this type of robot arm shows additional disadvantages that, since the ball bearing as above may not be made large, the length S of the sides $B_1$ and $B_2$ in sliding contact with the ball bearing may not be made long. Correspondingly, a substantial looseness of the sides $B_1$ and $B_2$ in respect to the members $X_1$ and $X_2$ is produced, and an accurate precision of positioning may not be obtained.

OBJECT OF THE INVENTION

It is an object of the present invention to provide a joint mechanism in which the disadvantages found in the conventional type of joint mechanism described above are substantially ameliorated or completely eliminated.

SUMMARY OF THE INVENTION

A joint mechanism according to the subject invention has a plurality of intermediate links connected like a chain which are linked so that they may be swivelled with respect to each other in any direction through universal joints. Both ball joints and sliding joints are arranged on each of the axes of the front and rear ends of each of the intermediate inks, and alternate intermediate links are connected through the above ball joints and sliding joints connected in series.

BRIEF DESCRIPTION OF THE DRAWINGS

FIG. 1(a) is a perspective view showing a skelton used to illustrate the technical concept of a conventional type of robot arm.

FIG. 1(b) is a schematic side elevational view showing a condition in which a conventional type of robot arm is folded.

FIG. 2 is a view showing a technical concept in which some links in a conventional type of robot arm are deformed under an influence of external force.

PREFERRED EMBODIMENTS OF THE INVENTION

Figure 3:
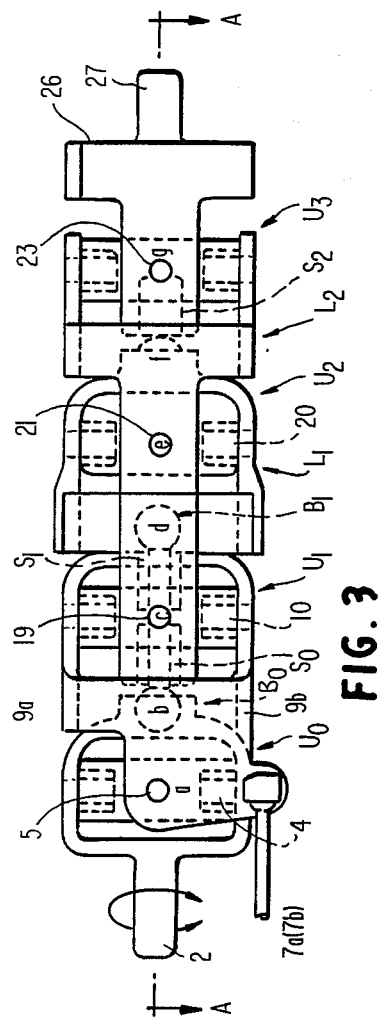
FIG. 3 is a top plan view showing a joint mechanism with four joints which is a first preferred embodiment of the present invention.

Referring now to FIG. 3 and the subsequent figures, the preferred embodiments of the present invention will be described for its better understanding.

The words "horizontal" and "vertical" used in the following description refers only to those directions in the drawings. They should be interpreted as broadly referring to any direction perpendicular to a robot arm which is inclined in any direction by turning and swinging the robot arm.

Figure 4:
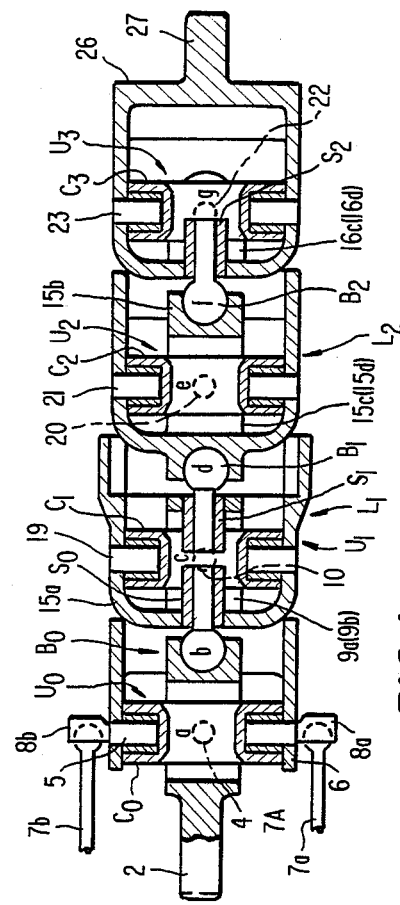
FIG. 4 is a sectional view taken along the line A—A in FIG. 3.
Figure 5:
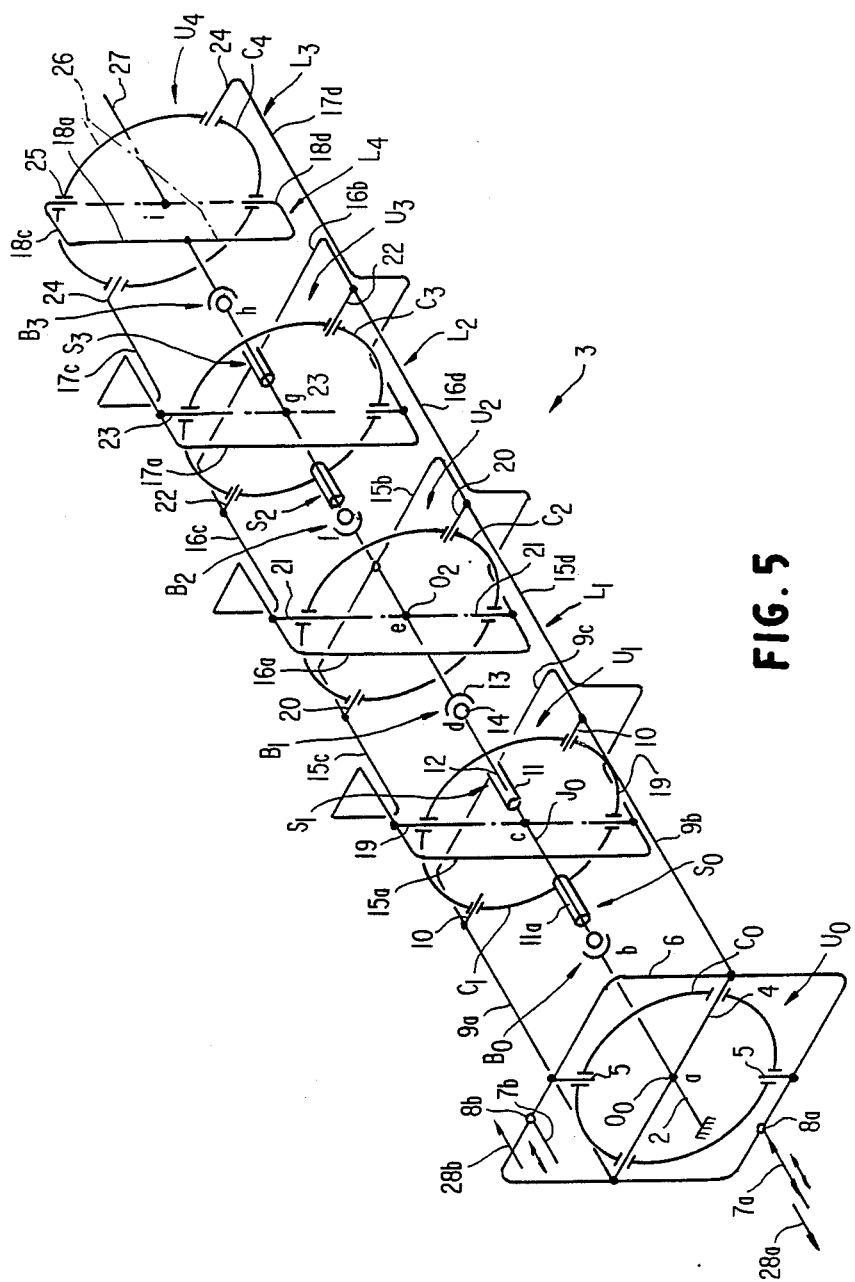
FIG. 5 is a perspective view showing a skeleton of the joint mechanism shown in FIGS. 3 and 4 (showing a mechanism of five joints).

In FIGS. 3 to 5, which show an extanded condition of the wrist joint mechanism, a member 2 is a shaft fixed to the proximal extremity end of the robot arm. The member 2 is used for fixing the wrist joint mechanism to the robot arm (not shown).

The member 2 is integrally fixed at a right angle to a swivelling shaft 4 of a universal joint $U_0$ which serves as the root member of the wrist joint mechanism.

Several structures of universal joint $U_0$ are already well-known in the art. For example, the above-described swivelling shaft 4 and a swivelling shaft 5 perpendicular to the swivelling shaft 4 may be rotatably arranged at an annular coupling ring $C_0$, respectively. In this case, when the swivelling shaft 4 is fixed in a horizontal direction as shown in FIG. 5, the coupling ring $C_0$ is rotatable around the swivelling shaft 4 in a vertical plane. Similarly, the swivelling shaft 5 is rotatable in a plane (horizontal plane) perpendicular to an axis of the above-mentioned swivelling shaft 5, so that a frame 6 fixed to the swivelling shaft 5 is supported by the member 2 in such a manner that it may be pivoted in any direction around a center point $O_0$ of the universal joint $U_0$ where the axes of the two swivelling shafts 4 and 5 intersect each other.

The structure of a universal joint $U_0$ such as is described above can be applied for subsequent universal joints $U_1$, $U_2$ . . . in the same manner as above. The illustrated structure is only one example of known universal joints, and the present invention is not limited to the use of universal joints constructed in accordance with the foregoing. It is possible to apply various kinds of well-known structures as a universal joint.

As described above, the frame 6 is fixed to the swivelling shaft 5 and pivotable around the swivelling shaft 5. To the frame 6 are pivotably connected the driving rods 7a and 7b, which are axially reciprocatable along the member 2 through ball couplings 8a and 8b. Either a simultaneous or an alternative axial movement of the connecting rods 7a and 7b in respect to the member 2 causes the frame 6 to be pivoted at any angle around the swivelling shafts 5 or 4 and enables the frame 6 to point in any direction.

To the frame 6 is rigidly fixed a substantially ]-shaped first link 9 composed of forwardly extending right and left members 9a, 9b and a member 9c arranged at the distal ends of the members 9a and 9b. To the members 9a and 9b is fixed a horizontal swivelling shaft 10 of a universal joint $U_1$. The distal end member 9c is fixed to a common sliding joint $S_1$ the axis of which intersects the axis $J_0$ of the member 2 at $O_0$.

The sliding joint $S_1$ is composed of a cylinder 11 and a piston 12 axially and slidably inserted into the cylinder 11. The piston 12 is connected at its distal end to a ball joint $B_1$ centered on the axis of the sliding joint $S_1$.

The ball joint $B_1$ is composed of a concave spherical bearing 13 and a ball 14 rotatably housed in the spherical bearing 13. The distal end of the piston 12 is fixed to the ball 14.

The structures of sliding joints $S_0$, $S_2$, $S_3$ . . . and ball joints $B_0$, $B_2$, $B_3$ . . . are the same as those of the sliding joint $S_1$ and the ball joint $B_1$.

The first intermediate link $L_1$ is composed of a vertical member 15a at its proximal end and a horizontal member 15b at its distal end as viewed in FIG. 5 and longitudinal members 15c, 15d connecting the end members 15a, 15b to make a closed annular form. The members 15a, 15b are connected to the U-shaped link $L_1$ to make a chain-like formation.

The relation between the links 9 and $L_1$ may similarly be applied to the subsequent second, third . . . intermediate links $L_2$, $L_3$ ... That is, the second intermediate link $L_2$ is connected to the first intermediate link $L_1$, and the third intermediate link $L_3$ is connected to the second intermediate link $L_2$, to make a chain-like formation, and all the intermediate links are constructed in the same manner as the first intermediate link $L_1$. In particular, the vertical member at the proximal end, the horizontal member at the distal end, and the two longitudinal members for connecting the end members are connected to form a closed annular shape.

Each of the intermediate links has a ball joint and a sliding joint located at its opposite ends, and the ball joints and sliding joints are connected in series. Accordingly, alternate intermediate links are connected to form the folding parts of the joint mechanism.

For example, the cylinder $11a$ of the sliding joint $S_0$ on the axis $J_0$ of the member 2 in FIG. 5 is fixedly connected to a member $15a$ arranged at the proximal end of the first intermediate link $L_1$, and a member $15b$ arranged at the distal end of the first intermediate link $L_1$ is similarly and fixedly connected to a ball joint $B_2$ located on the axis of the first intermediate link $L_1$.

The sliding joint $S_0$ is connected in series to the ball joint $B_0$ mounted on the member 2. In reference to the second intermediate link $L_2$, a member $16a$ at the proximal end thereof is fixedly connected to the spherical surface bearing 13 of the ball joint $B_1$, and a member $16b$ at the distal end thereof is fixedly connected to the sliding joint $S_3$ on the axis of the second intermediate link $L_1$.

In reference to the third intermediate link $L_3$, since this is the final intermediate link in the example shown in FIG. 5, a member $17a$ at the proximal end thereof has a sliding joint $S_2$ on the axis of the third intermediate link $L_3$. However, it is not necessary to arrange a ball joint at the distal end. It is also possible to connect a fourth intermediate link at the distal end of the third intermediate link $L_3$ to increase the number of joints. In such a case, a ball joint is arranged at the distal end of the third intermediate link $L_3$ and is connected to the fourth intermediate link.

As described above, the ball joint $B_0$ and the sliding joint $S_0$ are connected in series, the sliding joint $S_1$ and the ball joint $B_1$ are connected in series, and subsequently the first intermediate link $L_1$ and the third intermediate link $L_3$ are connected by a series connection between the ball joint $B_2$ at the distal end of the first intermediate link $L_1$ and the sliding joint $S_2$ at the proximal end of the third intermediate link $L_3$. Similarly, the second intermediate link $L_2$ and the foremost link $L_4$ (the foremost link $L_4$ is composed of little more than a member $18a$ at the proximal end) are related such that a sliding joint $S_3$ fixed to a member $16b$ at the distal end of the second intermediate link $L_2$ and a ball joint $B_3$ fixed to the proximal end of the foremost link $L_4$ are connected in series.

As described above, the adjoining intermediate links $L_1$, $L_2$, $L_3$ and the foremost link $L_4$ connected like a chain are linked so that they may be swivelled in any direction through each of the first to fourth universal joints $U_1$, $U_2$, $U_3$ and $U_4$ arranged at their crossing portions.

That is, the first universal joint $U_1$ is placed at the crossing part between the link 9 and the first intermediate link $L_1$. The horizontal swivelling shafts 10, 10 of the first universal joint $U_1$ are fixed at a right angle to the members $9a$, $9b$ of the first link 9 as described above, and each of the vertical swivelling shafts 19, 19 is connected at a right angle to each of the members $15c$, $15d$ of the first intermediate link $L_1$. Similarly, each of the horizontal swivelling shafts 20, 20 of the second universal joint $U_2$ connecting the first intermediate link $L_1$ to the second intermediate link $L_2$ is fixed at a right angle to the members $15c$, $15d$ of the first intermediate link $L_1$, and the vertical swivelling shafts 21, 21 are fixed at a right angle to the members $16c$, $16d$ constituting the second intermediate link $L_2$.

The third and fourth universal joints $U_3$ and $U_4$ are similarly constructed. The horizontal swivelling shafts 22 of the third univeral joint $U_3$ are arranged at the crossing part between the second intermediate link $L_2$ and the third intermediate link $L_3$ and are fixed at a right angle to the members $16c$, $16d$ constituting the second intermediate link $L_2$, and each of the vertical swivelling shafts 23, 23 is fixed at a right angle to each of the members $17c$, $17d$ constituting the third intermediate link $L_3$. The horizontal swivelling shafts 24, 24 of the fourth universal joint $U_4$ connecting the third intermediate link $L_3$ to the foremost link $L_4$ are fixed at a right angle to the members $17c$, $17d$ of the third intermediate link $L_3$, and each of the vertical swivelling shafts 25, 25 is fixed at a right angle to each of the members $18c$, $18d$ constituting a part of the foremost link $L_4$.

In the first preferred embodiment, as described above, since the universal joint $U_4$ constitutes the foremost joint, the foremost link $L_4$ extending from the universal joint $U_4$ forwardly requires only a part as described above, and a tool fixing shaft 27 for use in fixing tools such as a spray gun or a welding torch etc. is attached to a fixing member 26. The fixing member 26 is in turn attached to a joint ring $C_4$ which is part of the foremost universal joint $U_4$.

A supporting mechanism for each of the joints in the above-mentioned wrist joint mechanism will now be described.

When the driving rods $7a$, $7b$ are fixed at a desired position and the frame 6 is held at a right angle to the axis $J_0$ of the member 2, the swivelling shafts 4, 5 are fixed at a right angle to each other and to the axis $J_0$. Accordingly, if a plane made by the universal joint $U_0$ is held at a right angle in respect to the axis $J_0$ of the member 2 fixed to the robot arm, the universal joint $U_0$ and the frame 6 cannot perform a horizontal pivoting movement due to the fixed swivelling shaft 4. Furthermore, the universal joint $U_0$ and the frame 6 are fixed in their vertical direction by the driving rods $7a$, $7b$, so that they are fixed in a direction perpendicular to the axis of the fixed member 2. Thus, the first link 9 extending forwardly from the frame 6 at a right angle thereto is supported and fixed in a horizontal plane as shown.

Although the first intermediate link $L_1$ is supported by the first universal joint $U_1$ as described above in a way such that it may be swivelled in any direction in respect to the first link 9, the ball joint $B_0$ is present on the axis $J_0$ of the member 2 as a fixed point. Furthermore, the ball joint $B_0$ is fixed at a right angle in respect to the sliding joint $S_0$ mounted on the member $15a$ of the first intermediate link $L_1$, so the center $O_0$ of the universal joint $U_0$, the ball joint $B_0$, and the sliding joint $S_0$ are arranged on the axis $J_0$ in a line. Furthermore, the member 15 (which is perpendicular to the sliding joint $S_0$) is supported at a right angle in respect to the axis $J_0$, and therefore the axis of the first intermediate link $L_1$ and the axis $J_0$ coincide.

In this way, when the first intermediate link $L_1$ is supported and fixed in a horizontal direction, the center $O_2$ of the second universal joint $U_2$ is also arranged on the axis $J_0$, and the sliding joint $S_1$ fixed to the member 9c at the ends of the members 9a, 9b of the first link 9 also coincide with the axis $J_0$. Accordingly, the sliding joint $S_1$, the ball joint $B_1$, and the center $O_2$ are all arranged on the axis $J_0$, resulting in the second intermediate link $L_2$ also being supported and fixed in a horizontal direction.

Similarly, the third intermediate link $L_3$ and the foremost link $L_4$ are also supported and fixed in the direction of the axis $J_0$ of the member 2 (i.e., in a horizontal direction), so that the intermediate links $L_1$, $L_2$, and $L_3$ and the foremost link $L_4$ are all arranged on a line as shown in FIG. 5. This condition corresponds to a straight extended condition of the wrist joint mechanism. In this condition, the tool fixing shaft 27 at the distal end of the wrist joint mechanism is supported and fixed on an extended line of the member 2 and is coaxial therewith.

Next, with reference to FIGS. 5 and 8, an operation in which the wrist joint mechanism is folded in a vertical plane will be described.

For the sake of simplicity, it is assumed that the center $O_0$ of the universal joint $U_0$ is initially at a, the center of the ball joint $B_0$ is initially at b, the center of the first universal joint $U_1$ is initially at c, the center of the ball joint $B_1$ is initially at d, the center $O_2$ of the second universal joint $U_2$ is initially at e, the center of the ball joint $B_2$ is initially at f, the center of the third universal joint $U_3$ is initially at g, the center of the ball joint $B_3$ is initially at h, and the center of the fourth universal joint $U_4$ is initially at i.

At first, when the driving rod 7a is moved rearwardly as shown by an arrow 28a and the driving rod 7b is moved forwardly the same distance as shown by an arrow 28b, the frame 6 pivotally supported around the swivelling shaft 4 of the universal joint $U_0$ is inclined by an angle of $\alpha$ around the swivelling shaft 4. The first link 9, which is fixed at a right angle to the frame 6, is also similarly inclined.

The position of center b of the ball joint $B_0$ is fixed on the axis $J_0$ of the member 2, while the position of the center c of the first universal joint $U_1$ fixed to the first link 9 is displaced to the point $c_1$. Accordingly, a triangle $X_1$ is formed by the fixed points a and b and the center point $c_1$ of the first universal joint $U_1$ (see FIG. 8). The angle formed by the line connecting the points b and $c_1$ and the line connecting the points a and $c_1$ is defined as $\beta$.

The center c of the first universal joint $U_1$ in its straight line condition shown in FIG. 5 is displaced to the point $c_1$ with a radius of ac. At the same time, if the distance bc were constant, the point c would be displaced to a position $c_1'$. Since the positions $c_1$ and $c_1'$ are different, the swivelling movement of the first link 9 above would be impossible. However, in accordance with the present invention, the ball joint $B_0$ and the first universal joint $U_1$ are connected by the sliding joint $S_0$, so that the distance bc can be extended or shortened, and the point c can be displaced to the position $c_1$ in compliance with a constant radius of ac or $ac_1$—that is, the distance ac equals the distance $ac_1$.

Figure 8:
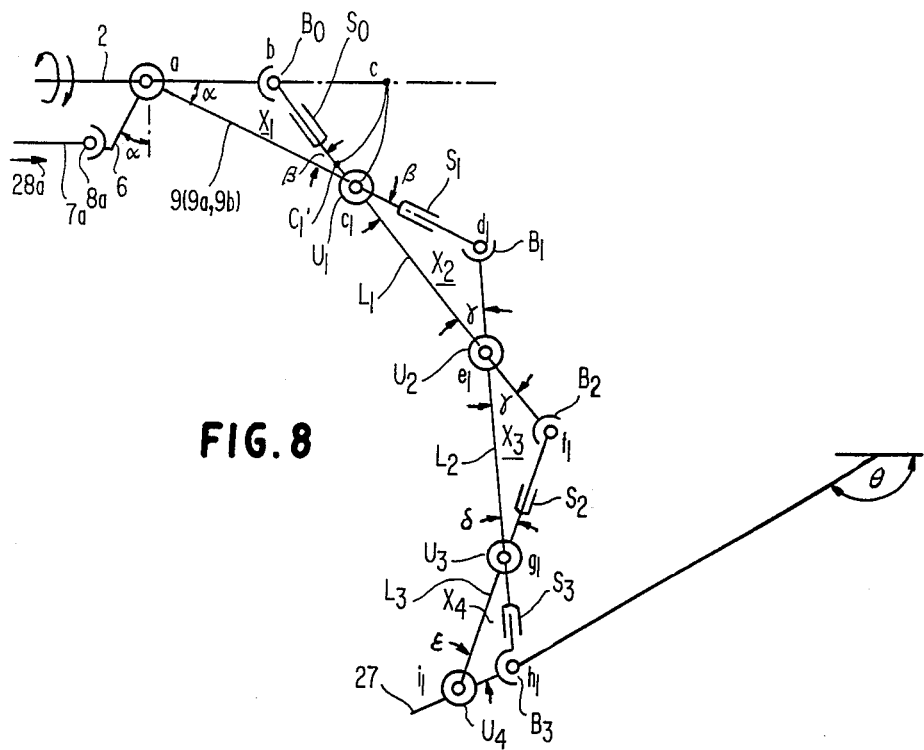
FIG. 8 is a schematic side elevational view showing a skelton of joint links where the joint mechanism shown in FIG. 5 (i.e., the first preferred embodiment) is in its folded condition.
Figure 9:
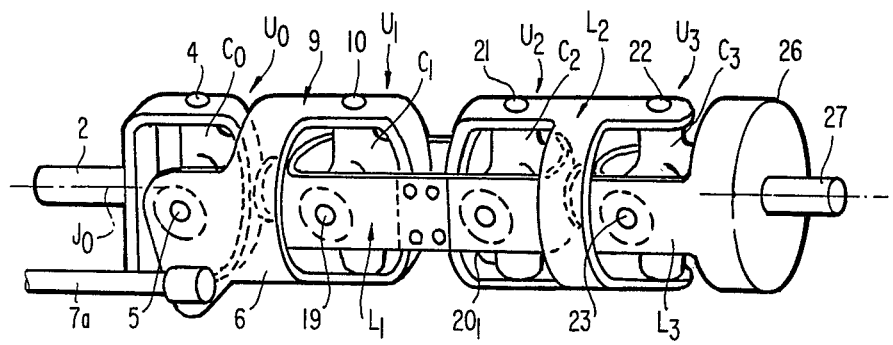
FIG. 9 is a perspective view for showing a condition in which a wrist joint mechanism is extended.

Furthermore, since the ball joint $B_0$ and the first universal joint $U_1$ are connected by the sliding joint $S_0$, the ball joint $B_0$, the sliding joint $S_0$, and the first universal joint $U_1$ are kept in their straight line condition as shown in FIG. 8. Accordingly, the first intermediate link $L_1$, which has the sliding joint $S_0$ mounted on the proximal end part on the axis thereof is also arranged on the line $bc_1$.

In the case of the second universal joint $U_2$ and the ball joint $B_2$, they are arranged on the axis of the first intermediate link $L_1$. Accordingly, the ball joint $B_0$, the sliding joint $S_0$, the first universal joint $U_1$, the second universal joint $U_2$, and the ball joint $B_2$ are all arranged in a line on the axis of the first intermediate link $L_1$.

As described above, an angle $\beta$ is formed by the line connecting the points b and $c_1$ and the line connecting the points a and $c_1$, and the sliding joint $S_1$ is arranged on the axis of the first link 9. Accordingly, the first intermediate link $L_1$ and the sliding joint $S_1$ are also inclined, by the angle $\beta$ in respect to the first link 9. Moreover, the ball joint $B_1$ is located on an extended line of the axis of the first link 9 and is spaced from the second universal joint $U_2$ by a specified distance (de). Accordingly, the position of the center $d_1$ of the ball joint $B_1$ is unconditionally defined, and a triangle $X_2$ is formed by the center point $e_1$ of the second universal joint $U_2$ and the points $c_1$ and $d_1$.

Although the straight line condition shown in FIG. 5 provided the center point d of the ball joint $B_1$ on the axis of the first intermediate link $L_1$, the condition shown in FIG. 8 causes the center point d of the ball joint $B_1$ to be displaced from the axis of the first intermediate link $L_1$ to the position $d_1$. The distance between the points $e_1$ and $d_1$ is kept constant, so the distance between the points $c_1$ and $d_1$ must be varied. A variation in this distance is accommodated by the sliding joint $S_1$. In this way, the second intermediate link $L_2$ is inclined only by an angle $\gamma$ with respect to the first intermediate link $L_1$ around the second universal joint $U_2$.

In the same operation, the center point f of the ball joint $B_2$ mounted on the distal end of the first intermediate link $L_1$ is displaced to the point $f_1$. At the same time, the third universal joint $U_3$ is arranged on the second intermediate link $L_2$ along with the above-described ball joint $B_1$ and the second universal joint $U_2$. Furthermore, the sliding joint $S_3$ is mounted on the distal end of the second intermediate link $L_2$. The center point g of the third universal joint $U_3$ is displaced to the position $g_1$, and a triangle $X_3$ is formed by $e_1$, $f_1$, and $g_1$. The variation in distance between the ball joint $B_2$ and the third universal joint $U_3$ due to the movement of the connecting rods 7a, 7b is accommodated by the sliding joint $S_2$.

The ball joint $B_2$, the sliding joint $S_2$, the third universal joint $U_3$, and the fourth universal joint $U_4$ are arranged in a line on the third intermediate link $L_3$. Accordingly, a folding angle $\delta$ around the third universal joint $U_3$ is formed between the second intermediate link $L_2$ and the third intermediate link $L_3$.

At this folding angle $\delta$, the center point h of the ball joint $B_3$ found on the extended line of the second intermediate link $L_2$ is displaced to $h_1$. A triangle $X_4$ is formed by the center point $i_1$ of the fourth universal joint $U_4$, $g_1$, and $h_1$. The third intermediate link $L_3$ and the foremost link $L_4$ diverge by an angle $\epsilon$. Therefore, the tool fixing shaft 27 arranged on the extended line of the foremost link $L_4$ is directed in a direction folded by an angle $\epsilon$ in respect to the third intermediate link $L_3$.

Thus, if the frame 6 is inclined only by an angle $\alpha$ in a vertical plane from its condition perpendicular to the member 2 shown in FIG. 5, the first link 9 is inclined by the angle $\alpha$ in respect to the member 2, the first intermediate link $L_1$ is inclined by an angle $\beta$ in respect to the first link 9, the second intermediate link $L_2$ is inclined by an angle $\gamma$ in respect to the first intermediate link $L_1$, the third intermediate link $L_3$ is inclined by an angle $\delta$ in respect to the second intermediate link $L_2$, and the foremost link $L_4$ and the tool fixing shaft 27 are inclined by an angle $\epsilon$ in respect to the third intermediate link $L_3$. Since these swivelling directions are present in the same vertical plane, the tool fixing shaft 27, which was initially directed in a horizontal direction as shown in FIG. 5, is swivelled by an amount corresponding to $\alpha+\beta+\gamma+\delta+\epsilon=\theta$ due to the inclination of the frame 6 to the angle $\alpha$. Accordingly, the wrist may be gradually and softly folded.

When the above-mentioned wrist joint mechanism is to be swivelled in a horizontal plane, the driving rods 7a and 7b are forwarded or retracted by the same amount in directions indicated by the arrow 28a or 28b, and the frame 6 is pivoted around the swivelling shaft 5 in a horizontal plane. Since the folded condition of each of the joints in this case is the same as that shown in FIG. 8, the horizontal folding operation will not be described further.

Figure 6A:
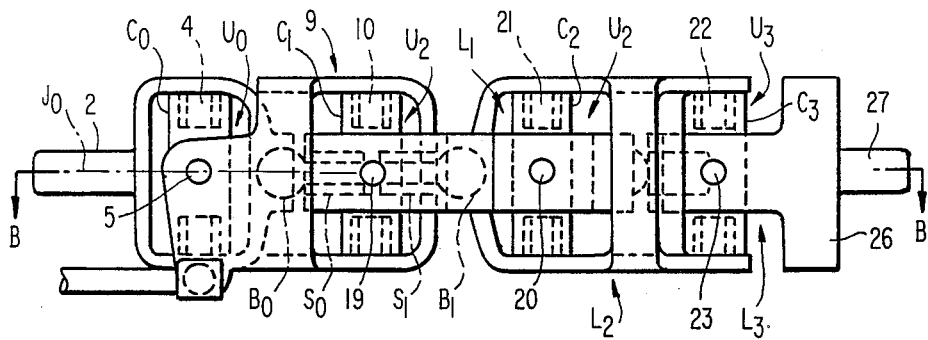
FIG. 6(a) is a top plan view showing a joint mechanism with four joints which is a second preferred embodiment of the present invention.
Figure 6B:
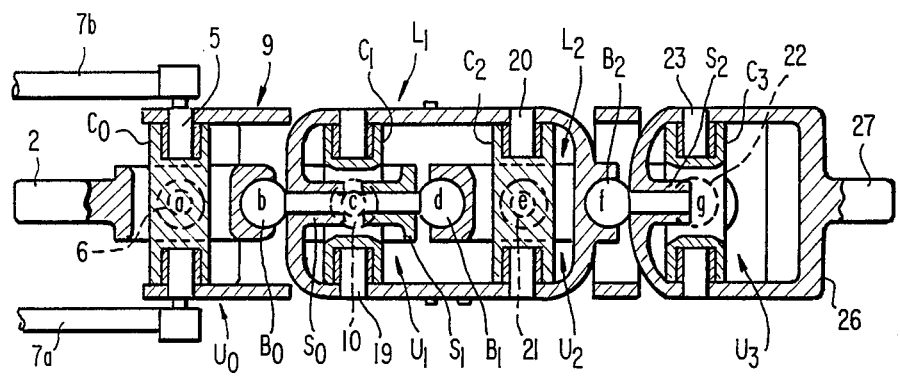
FIG. 6(b) is a sectional view taken along the line B—B of FIG. 6(a).
Figure 7:
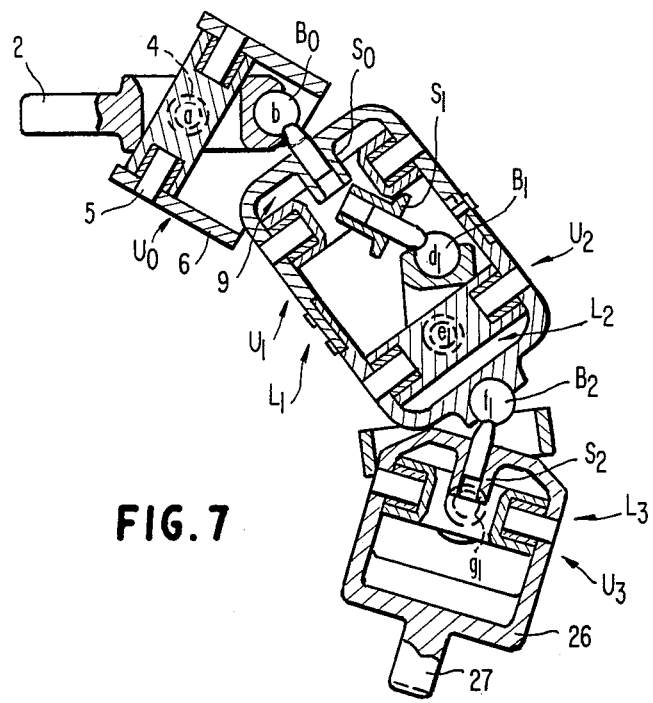
FIG. 7 is a side sectional view showing a folded condition of each of the links when the wrist joint mechanism in the second preferred embodiment shown in FIGS. 6(a) and 6(b) is folded in a vertical plane.

In the case of the second preferred embodiment, shown in FIG. 6(a), 6(b), and FIG. 7, a distal end member and a proximal end member constituting each intermediate link are parallel to each other. That is, the second embodiment is different from the first embodiment shown in FIGS. 3 to 5 in which the distal and proximal end members of each intermediate link are at a right angle to each other. However, the second embodiment is similar to the first embodiment in that the end members adjoining intermediate links are connected by universal joints rotated in any direction with respect to each other. Accordingly, the function of the second embodiment is quite the same as that of the mechanism shown in FIGS. 3 to 5, and therefore a detailed description of the second embodiment will be omitted.

In the above-mentioned preferred embodiments, an application of the present invention to a wrist joint mechanism has been described. However, it is apparent that the joint mechanism constructed in accordance with the present invention is not limited to functioning as a wrist mechanism. For instance, the subject joint mechanism may be applied as an arm mechanism in which the member 2 is fixed to a fixed block, a swivelling block, or base portions of other arms.

ADVANTAGES OF THE INVENTION

As described above, the present invention provides a joint mechanism in which a plurality of intermediate links connected like a chain are linked so that they may be swivelled with respect to each other in any direction through universal joints. Ball joints and sliding joints are arranged on each of the axes of the front and rear ends of each of the intermediate links, and alternate intermediate links are connected by the above-described ball joints and sliding joints connected in series. Accordingly, the folding direction of the joint mechanism is not limited to one direction as found in the conventional type of robot arm, and the joint mechanism may be folded or swivelled in any direction.

Furthermore, since sliding joints accommodating the variations in the distance between components at the joints during folding are arranged on the axis of each of the intermediate links, if twistings are produced at the joint mechanism under an external force, neither a jamming nor an increased surface pressure caused by these twistings occurs at the sliding joint, and a smooth folding operation is always obtained.

Moreover, both the sliding joints and the ball joints are arranged at a central part of the joint mechanism where a sufficient amount of space is found—i.e., at the intersection of the axes of each of the intermediate links. Accordingly, the outer diameters and lengths of the sliding joints and the diameter of the ball joints can be sufficiently large so that the present invention provides a joint mechanism in which rigidity and durability against external forces are improved and which is capable of enduring a high load, although the joint mechanism itself is quite small in size.

Furthermore, joint mechanisms constructed in accordance with the present invention are made such that the universal joints, the ball joints, and the sliding joints have a high rigidity and are capable of keeping a high degree of accuracy. Accordingly, the present invention succeeds in providing a joint mechanism having a high degree of rigidity, less looseness than in many prior art devices, and a quite high degree of precision in positioning operations.

What is claimed as new and desired to be secured by Letters Patent of the United States is:

1. A wrist joint mechanism for a manipulator, said wrist joint mechanism comprising:
   (a) a rotatable shaft member having an axis and a proximal end and a distal end;
   (b) a first universal joint having a center point located on the axis of said rotatable shaft member, said first universal joint being mounted on said rotatable shaft member intermediate its proximate and distal ends;
   (c) a first element having an axis and a proximal end and a distal end, the proximal end of said first element being mounted on said first universal joint for pivotal movement relative to said rotatable shaft member;
   (d) flexing means for pivoting said first element on said first universal joint;
   (e) a second universal joint having a center point located on the axis of said first element, said second universal joint being mounted on said first element intermediate its proximal and distal ends;
   (f) a second element having an axis and a proximal end and a distal end, the proximal end of said second element being mounted on said second universal joint for pivotal movement relative to said first element;
   (g) a first sliding joint disposed between the distal end of said rotatable shaft member and the proximal end of said second element, said first sliding joint having a sliding axis which extends along the axis of said second element and through the center point of said second universal joint;
   (h) a third universal joint having a center point located on the axis of said second element, said third universal joint being mounted on said second element intermediate its proximal and distal ends;
   (i) a third element having an axis and a proximal end and a distal end, the proximal end of said third element being mounted on said third universal joint for pivotal movement relative to said second element; and
   (j) a second sliding joint disposed between the distal end of said first element and the proximal end of said third element, said second sliding joint having a sliding axis which intersects the axis of said second element at the center point of said second universal joint.

2. A wrist joint mechanism as recited in claim 1 wherein said first universal joint comprises:
(a) a first annular coupling ring;
(b) a first swiveling shaft which is fixed at a right angle to said rotatable shaft member and which is journaled in said first annular coupling ring, said first swiveling shaft having an axis which intersects the center point of said first universal joint; and
(c) a second swiveling shaft which is journaled in said first annular coupling ring at a right angle to said first swiveling shaft and which is fixed in said first element, said second swiveling shaft having an axis which intersects the center point of said first universal joint,
whereby said first annular coupling ring is pivotable in a first plane relative to said rotatable shaft member about said first swiveling shaft and said first element is pivotable in a second plane, perpendicular to said first plane, relative to said first annular coupling ring about said second swiveling shaft.

3. A wrist joint mechanism as recited in claim 2 wherein said flexing means comprise two drive rods which are axially reciprocable relative to said rotatable shaft member and which are connected to said first element by ball couplings at points spaced from both said first and second swiveling shafts, whereby motion of said two drive rods in the same direction causes said first element to pivot in one of said first and second planes and motion of said two drive rods in opposite directions causes said first element to pivot in the other of said first and second planes.

4. A wrist joint mechanism as recited in claim 3 wherein said ball couplings comprise female portions formed on said first element and male portions formed on the end of said drive rods.

5. A wrist joint mechanism as recited in claim 2 wherein said first element comprises:
(a) a proximal member to which said second swiveling shaft is fixed;
(b) a pair of space side members each of which has a proximal end and a distal end, the proximal end of each of said space side members being connected to said proximal member; and
(c) a distal member which is connected to the distal end of each of said spaced side members and to which said second slide joint is fixed.

6. A wrist joint mechanism as recited in claim 2 wherein said second universal joint comprises:
(a) a second annular coupling ring;
(b) a third swiveling shaft which is fixed at a right angle to said first element and which is journaled in said second annular coupling ring, said third swiveling shaft having an axis which intersects the center point of said seecond universal joint; and
(c) a fourth swiveling shaft which is journaled in said second annular coupling ring at a right angle to said third swiveling shaft and which is fixed in said second element, said fourth swiveling shaft having an axis which intersects the center of said second universal joint,
whereby said second annular coupling ring is pivotable in a third plane relative to said first element about said third swiveling shaft and said second element is pivotable in a fourth plane, perpendicular to said third plane, relative to said second annular coupling ring about said fourth swiveling shaft.

7. A wrist joint mechanism as recited in claim 6, wherein said first and third planes are the same plane and said second and fourth planes are the same plane.

8. A wrist joint mechanism as recited in claim 1 wherein said first sliding joint comprises a first cylinder and a first piston having a proximal end and a distal end, said first piston being axially and slidably inserted into said first cylinder.

9. A wrist joint mechanism as recited in claim 8 wherein:
(a) said first cylinder is fixed to the proximal end of said second element;
(b) the proximal end of said first piston is connected to a first ball joint having a center point located on the sliding axis of said first sliding joint; and
(c) said first ball joint is fixed to the distal end of said rotatable shaft member.

10. A wrist joint mechanism as recited in claim 9 wherein said first ball joint is composed of a first ball fixed to the proximal end of said first piston and a first concave spherical bearing in which said first ball is received, said first concave spherical bearing being fixed to the distal end of said rotatable shaft member.

11. A wrist joint mechanism as recited in claim 1 wherein said second element comprises:
(a) a proximal member to which said first sliding joint is fixed;
(b) a pair of spaced side members each of which has a proximal end and a distal end, the proximal end of each of said spaced side members being connected to said proximal member; and
(c) a distal member which is connected to the distal end of each of said spaced side members.

12. A wrist joint mechanism as recited in claim 1 wherein said third universal joint comprises:
(a) a third annular coupling ring;
(b) a fifth swiveling shaft which is fixed at a right angle to said second element and which is journaled in said third annular coupling ring, said fifth swiveling shaft having an axis which intersects the center point of said third universal joint; and
(c) a sixth swiveling shaft which is journaled in said third annular coupling ring at a right angle to said fifth swiveling shaft and which is fixed to said third element, said sixth swiveling shaft having an axis which intersects the center point of said third universal joint,
whereby said third annular coupling ring is pivotable in a fifth plane relative to said second element about said fifth swiveling shaft and said third element is pivotable in a sixth plane, perpendicular to said fifth plane, relative to said third annular coupling ring about said sixth swiveling shaft.

13. A wrist joint mechanism as recited in claim 1 wherein said third element comprises:
(a) a proximal member to which said second sliding joint is fixed;
(b) a pair of spaced side members each of which has a proximal end and a distal end, the proximal end of each of said spaced side members being connected to said proximal member; and
(c) a distal member which is connected to the distal end of each of said spaced side members.

14. A wrist joint mechanism as recited in claim 1 wherein said second sliding joint comprises a second cylinder and a second piston having a proximal end and a distal end, said second piston being axially and slidably inserted into said second cylinder.

15. A wrist joint mechanism as recited in claim 14 wherein:
(a) said second cylinder is fixed to the distal end of said first element;
(b) the distal end of said second piston is connected to a second ball joint having a center point located on the sliding axis of said second sliding joint; and
(c) said second ball joint is fixed to the proximal end of said third element.

16. A wrist joint mechanism as recited in claim 15 wherein said second ball joint is composed of a second ball fixed to the distal end of said second piston and a second concave spherical bearing in which said second ball is received, said second concave spherical bearing being fixed to the proximal end of said third element.

17. A wrist joint mechanism as recited in claim 1 and further comprising:
(a) a fourth element having an axis and a proximal end and a distal end, the proximal end of said fourth element being mounted on a fourth universal joint for pivotable movement relative to said third element;
(b) a third sliding joint disposed between the distal end of said second element and the proximal end of said fourth element; and
(c) said fourth universal joint having a center point located on the axis of said third element, said fourth universal joint being mounted on said third element intermediate its proximal and distal ends.

18. A wrist joint mechanism as recited in claim 17 wherein said fourth universal joint comprises:
(a) a fourth annular coupling ring;
(b) a seventh swiveling shaft which is fixed at a right angle to said third element and which is journaled in said fourth annular coupling ring, said seventh swiveling shaft having an axis which intersects the center point of said fourth universal joint; and
(c) an eighth swiveling shaft which is journaled in said fourth annular coupling ring at a right angle to said seventh swiveling shaft and which is fixed to said fourth element, said eighth swiveling shaft having an axis which intersects the center point of said fourth universal joint,
whereby said fourth annular coupling ring is pivotable in a seventh plane relative to said third element about said seventh swiveling shaft and said fourth element is pivotable in an eighth plane, perpendicular to said seventh plane, relative to said fourth annular coupling ring about said eighth swiveling shaft.

19. A wrist joint mechanism as recited in claim 17 wherein said fourth element comprises:
(a) a proximal member to which said third sliding joint is fixed;
(b) a pair of spaced side members each of which has a proximal end and a distal end, the proximal end of each of said spaced side members being connected to said proximal member; and
(c) a distal member which is connected to the distal ends of each of said spaced side members.

20. A wrist joint mechanism as recited in claim 17 wherein said third sliding joint comprises a third cylinder and a third piston having a proximal end and a distal end, said third piston being axially and slidably inserted into said third cylinder.

21. A wrist joint mechanism as recited in claim 20 wherein:
(a) said third cylinder is fixed to the proximal end of said fourth element;
(b) the proximal end of said third piston is connected to a third ball joint having a center point located on the sliding axis of said third sliding joint; and
(c) said third ball joint is fixed to the distal end of said second element.

22. A wrist joint mechanism as recited in claim 21 wherein said third ball joint is composed of a third ball fixed to the proximal end of said third piston and a third concave spherical bearing in which said third ball is received, said third concave spherical bearing being fixed to the distal end of said second element.

* * * * *